June 1, 1937.　　　R. F. RUTHRUFF　　　2,082,519
OLEFIN POLYMERIZATION
Filed Sept. 8, 1934
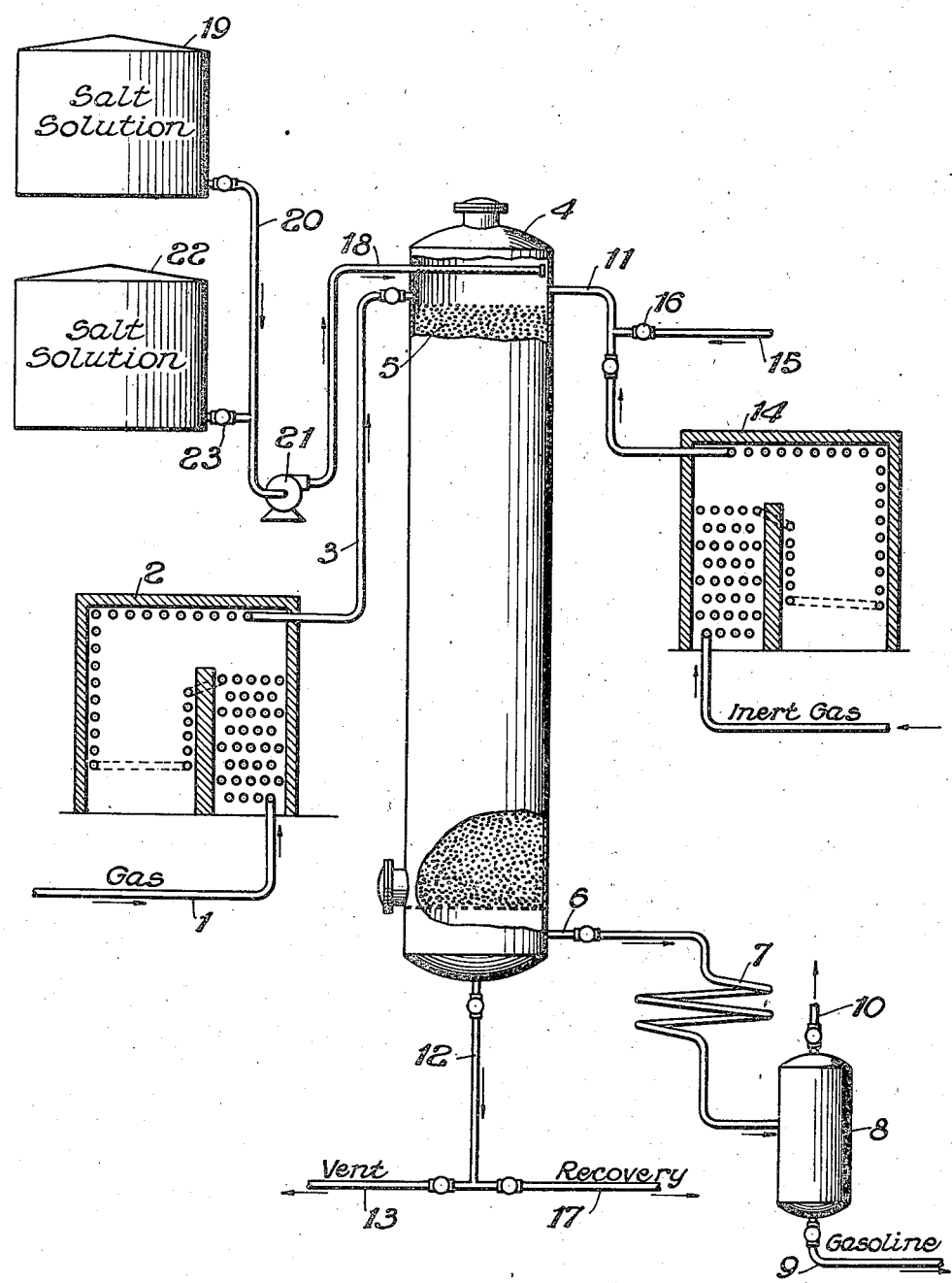
INVENTOR
Robert F. Ruthruff
BY
ATTORNEY Patented June 1, 1937

2,082,519

UNITED STATES PATENT OFFICE 2,082,519

OLEFIN POLYMERIZATION

Robert F. Ruthruff, Whiting, Ind., assignor to Standard Oil Company, Chicago, Ill., a corporation of Indiana Application September 8, 1934, Serial No. 743,251

2 Claims. (Cl. 196—10)

This invention relates to a process of converting hydrocarbon gases to higher boiling liquid hydrocarbons principally of the character of gasoline and kerosene. The process employed is known as polymerization, and the gaseous hydrocarbons used as the starting material are usually unsaturated or olefinic in character. An object of the invention is to effect the polymerization at moderate temperatures in the presence of catalysts. Another object of the invention is to restore the catalyst to its original effectiveness without requiring replacement. Other objects will become apparent as the description proceeds.

The catalysts employed in this process are of the halogen double salt type of which sodium chloroaluminate is an example. They are compounds of a metal halide of low internal pressure, such as aluminum chloride, ferric chloride, etc., with other metal halides, usually halides of high internal pressure such as the alkali metal chlorides, copper chloride, etc. As an example of the process, reference will be made to the accompanying drawing which forms a part of this specification.

A suitable hydrocarbon gas which may, for example, contain 20–30% of propylene in admixture with other hydrocarbons such as ethylene, ethane, butane and propane, is introduced under pressure by line 1 entering heater 2 where it is heated to the desired reaction temperature which may be 200–800° F. depending on the composition of the gas and the activity of the catalyst, but about 350° F. is satisfactory for the catalysts most commonly used. The heated gas is then led by line 3 to reaction chamber 4, preferably entering at a point above the catalyst bed 5. The pressure may vary over a wide range from 50 to 2000 lbs. per sq. in., but I find a pressure of 700 lbs. per sq. in. to be satisfactory.

The gases pass through the catalysts leaving the reaction chamber by line 6 leading to condenser or heat exchanger coil 7 where higher boiling products are condensed and collected in receiver 8. These are drawn off to suitable stabilizing and treating apparatus by line 9, while the uncondensed gases are discharged through line 10. These may be used again in the system after mixing with further quantities of olefin gases or after subjecting to pyrolysis and conversion to olefins.

Referring again to the reaction chamber the catalyst bed is suitably a porous mass of a double halide salt, for example, the double compound of sodium and aluminum chloride, supported on graded pumice, coke, charcoal, asbestos, silica, tile or the like. After the polymerization has continued for a considerable time and the activity of the catalyst has been seriously impaired, it is regenerated by interrupting the flow of gases through line 3 and raising the temperature by introducing a stream of highly heated, inert gas by line 11. This may be preceded or accompanied with a current of steam, not shown. The gases are discharged through lines 12 and 13.

The gas introduced through line 11 may be heated to a temperature of 800–2000° F. in furnace 14 provided for the purpose, or furnace 2 may be alternately used for this purpose if desired. The gas may be hydrogen, nitrogen, producer gas, flue gas, methane, or in fact any gas which will serve to transfer heat at the temperature desired. As a result of the heating by the current of hot gases, the catalyst is completely freed of sludge contamination, these heavy hydrocarbons being distilled away or decomposed. When the heating is completed, the entire mass of catalyst may be at a temperature of 1800° F. and consists of $NaAlCl_4$, aluminum oxide, sodium chloride, carbon and catalyst support, e. g. coke. The inert gas stream is discontinued or at least reduced, and a stream of a halogen, such as chlorine is next introduced into the hot catalyst mass by line 15 and valve 16. The reaction which takes place results in the conversion of the $Al_2O_3$, carbon and NaCl into $NaAlCl_4$ and carbon monoxide, the latter gas passing out through vent 12. When the entire catalyst has been regenerated in this way, it is allowed to cool to the proper temperature and then the stream of olefin gases is resumed. In this way, the catalyst can be used almost indefinitely, and by providing a spare reaction chamber, the polymerization can be continued uninterruptedly by alternately renewing the catalyst in each tower.

After repeated reuse, there is a tendency for the active constituents of the catalyst to be carried away or fluxed by the sludge above referred to. This sludge which flows from the catalyst during operation can be drawn off through lines 12 and 17 and later the valuable constituents recovered. To replace this loss, I may, from time to time, and before regenerating the catalyst, introduce further quantities of the active catalyst salts through line 18. For example, in tank 19, I may have a supply of aluminum chloride in solution which is led by line 20 to pump 21 and thence to line 18. In tank 22 I may likewise have a supply of sodium chloride in solution, likewise connected to pump 21 by valve 23. The desired amount of each solution may be admitted to the tower and distributed over the catalyst support therein. Then when the heated gas from 11 is introduced, the water in the solution is completely evaporated, resulting in extensive hydrolysis of $AlCl_3$ to form $Al_2O_3$ which enters the later reaction as described above.

Instead of heating the catalyst mass by means of a heated inert gas as shown, I may employ a catalyst chamber so constructed that heat may be supplied indirectly to the catalyst. This may be done in the conventional way by the use of a heating jacket and flues disposed throughout the catalyst bed, a heated fluid being circulated therethrough. The same system of heat exchange may be employed to conduct heat away from the reaction chamber when polymerization reaction is in progress, as the polymerization reaction is exothermic, requiring removal of heat to maintain the proper temperature. The invention has been described by reference to certain catalysts and apparatus but its scope should be limited only by the following claims.

I claim:

1. In an operation wherein normally gaseous hydrocarbons which are olefinic in character are subjected to elevated temperatures and pressures to effect polymerization thereof into higher boiling liquid hydrocarbons while in contact with a catalyst comprising a double salt of sodium chloride and aluminum chloride disposed on a suitable support, which operation when carried out over a period of time contaminates said catalyst and materially decreases the activity thereof, the improvement of restoring the activity of the catalyst which comprises interrupting the supply of said normally gaseous hydrocarbons being treated, treating said catalyst with a solution of said double salt to substantially eliminate said contamination and effect reimpregnation of said catalyst support with said double salt, heating said catalyst mass to remove moisture therefrom, and thereafter introducing chlorine into intimate contact with said catalyst to restore the activity thereof.

2. In an operation wherein normally gaseous hydrocarbons which are olefinic in character are subjected to elevated temperatures and pressures to effect polymerization thereof into higher boiling liquid hydrocarbons while in contact with a catalyst comprising a double salt of sodium chloride and aluminum chloride disposed on a suitable support, which operation when carried out over a period of time contaminates said catalyst and materially decreases the activity thereof, the improvement of restoring the activity of the catalyst which comprises interrupting the supply of said normally gaseous hydrocarbons being treated, treating said catalyst with a solution of said double salt to substantially eliminate said contamination and effect reimpregnation of said catalyst support with said double salt, introducing an inert gas, at a temperature higher than the temperature attained during the polymerization of the hydrocarbons, into intimate contact with said catalyst to heat said catalyst and remove moisture therefrom, and thereafter introducing chlorine into intimate contact with said catalyst to restore the activity thereof.

ROBERT F. RUTHRUFF